United States Patent [19]

Howard

[11] 4,075,778
[45] Feb. 28, 1978

[54] FISHING LURE
[76] Inventor: Charles R. Howard, 404 Newcomb St., Whitewater, Wis. 53190
[21] Appl. No.: 721,553
[22] Filed: Sep. 8, 1976
[51] Int. Cl.² ............................................. A01K 85/01
[52] U.S. Cl. ..................................... 43/42.31; 43/42.5
[58] Field of Search ................... 43/42.31, 42.5, 42.51, 43/42.52, 42.48, 42.18, 42.47, 42.32, 42.17, 42.2, 42.34, 42.49

[56] References Cited
U.S. PATENT DOCUMENTS

| 1,317,890 | 10/1919 | Patton | 43/42.51 |
| 2,945,317 | 7/1960 | Wittmann | 43/42.5 |
| 3,264,775 | 8/1966 | Nahigian | 43/42.5 |
| 3,418,744 | 12/1968 | Panicci | 43/42.5 |
| 3,673,728 | 7/1972 | Danbrova | 43/42.51 |

Primary Examiner—Jay N. Eskovitz
Assistant Examiner—Robert P. Swiatek
Attorney, Agent, or Firm—Andrus, Sceales, Starke & Sawall

[57] ABSTRACT

A fish lure is formed of an elongated strip. The strip is twisted so that the end portions are rotated 90° with respect to each other. The center of the lure comprises a pair of triangular sections formed by creases in the strip.

6 Claims, 3 Drawing Figures

U.S. Patent     Feb. 28, 1978     4,075,778
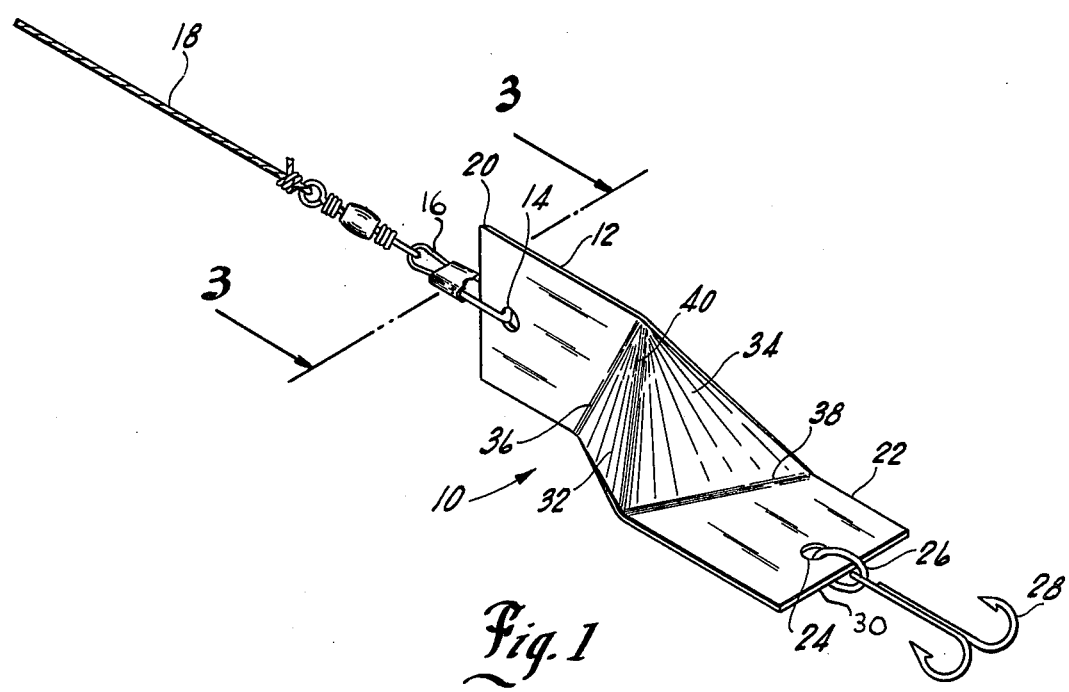
Fig. 1
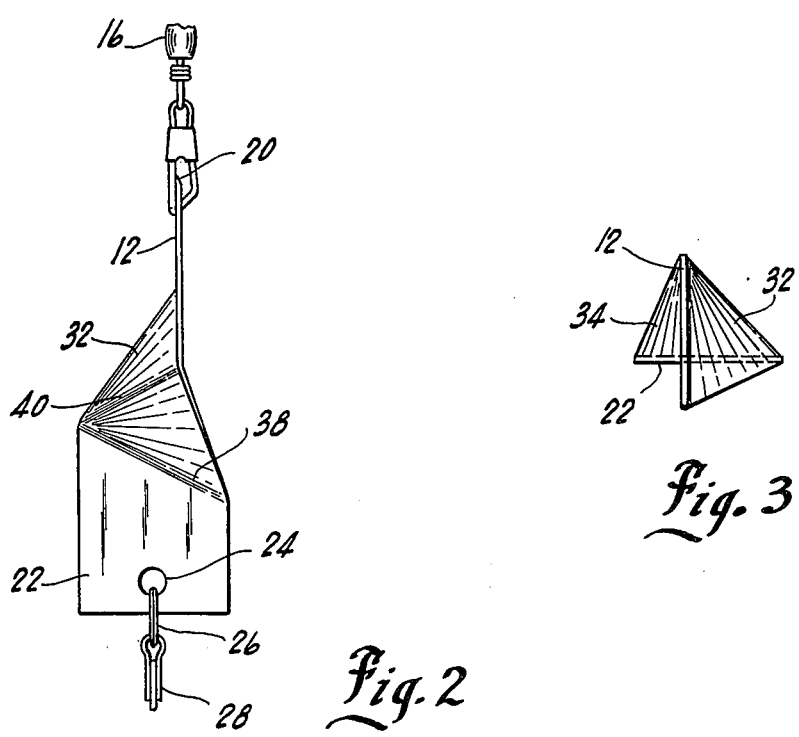
Fig. 2
Fig. 3

FISHING LURE

BACKGROUND OF THE INVENTION

1. Field of the Invention

The present invention is directed to an artifical bait of the spoon type.

2. Summary of the Present Invention

A large number of artificial baits or lures have been developed which utilize a curved piece of metallic material to attract fish by their movement through the water. Some of these lures employ an indented piece of metal so that the lures are commonly to as "spoons". Other lures are formed in a generally helical configuration.

In contrast to the foregoing lures, which generally employ smooth and/or continuously curved elements, the present invention is characterized by a plurality of sharp bends in the material which form a plurality of angularly disposed planar elements in the lure.

The lure of the present invention is formed of an elongated rectangular strip of material such as metal. Portions located at each end of the lure lie at right angles in the direction of elongation of the strip as a result of the sharp bends. These planar end portions provide straight forward and trailing edges to the lure. A center of the lure is comprised of pair of generally planar triangular sections. The triangular sections are bent out of the planes of the end portions at common creases between the end portions and the adjoining triangular sections. The triangular sections are joined at an intermediate crease.

The lure so formed attracts fish by both sight and sound.

BRIEF DESCRIPTION OF THE DRAWING

FIG. 1 is a perspective view of the fish lure of the present invention.

FIG. 2 is a top view of the lure.

FIG. 3 is an end view of the lure taken along the line 3—3 of FIG. 1.

BRIEF DESCRIPTION OF THE PREFERRED EMBODIMENT

The fish lure of the present invention is designated by the number 10 in FIG. 1. The lure is formed from a rectangular strip of material, such as metal or plastic. Lure 10 includes leading end portion 12 having a hole 14 for receiving connector 16 connected to fishing line 18. Leading end portion 12 is planar and presents a straight forward edge 20 for lure 10. Lure 10 also includes planar trailing end portion 22 containing hole 24 for receiving ring 26 for attaching a fish hook, such as treble hook 28. Trailing end portion 22 presents a straight rear edge 30. As shown most clearly in FIG. 2, the plane in which leading end portion 12 lies is located at right angles to the plane in which trailing end portion 22 lies.

The central portion includes a pair of generally planar triangular sections 32 and 34. Triangular section 32 includes an edge joined to the rear of leading end portion 12 along crease 36. Crease 36 is a sharp bend to deflect planar triangular section 32 out of the plane of leading end portion 12.

In a similar fashion planar triangular section 34 is bent out of the plane of trailing end portion 22 through sharp crease 38.

Triangular sections 32 and 34 are joined along mutual sharp crease 40. Crease 40 is non parallel to forward edge 20 and rear edge 30 and converges toward opposite sides of the strip of material forming lure 10. The angle of convergence may typically be 30° – 60°, for example 45°, with respect to the side of the strip. Creases 36 and 38 lie non parallel with respect to forward edge 20 and rear edge 30, respectively, at an angle commensurate with the angle of convergence of crease 40. The angles of creases 36 and 38 and the amount of bend at the creases is such as to establish the right angle relationship of leading end portion 12 and trailing end portion 22.

In use, the planar traingular sections 32 and 34 impart a combined erratic zig-zag and spinning motion to the lure when it passes through the water during descent upon casting and upon reeling in. This action resembles that of a minnow and can be altered by the speed at which the lure is drawn through the water to duplicate the motion of a healthy, wounded, or dying minnow. Lure 10 surfaces at a rather slow rate during reeling in making it easier for the fisherman to control the depth at which he fishes.

Triangular sections 32 and 34 reflect light toward the ends of the lure while flat ends 12 and 22 reflect light from side to side. This serves to attract fish from all directions.

When drawn through the water, the squared ends of the lure trap the water, providing the flopping sound resembling that of a wounded minnow, thus attracting fish by sound as well as sight.

The square corners of rear edge 30, as well as the width of lure 10, helps to guide weeds past hook 28 without snagging. The width of lure 10 preferably exceeds the span of hook 28. Forward edge 20 may be sharpened to cut the weeds as the lure passes.

The surfaces of the material of lure 10 may be plated to a shining, reflective finish. Various portions, or all, of lure 10 may also be painted.

Various modes of carrying out the invention are contemplated as being within the scope of the following claims particularly pointing out and distinctly claiming the subject matter which is regarded as the invention.

I claim:

1. A fish lure formed of an elongated rectangular strip of material, said lure having planar leading and trailing end portions located at opposite ends of a central axis of elongation of said strip, said end portions being trapezoidal in shape, the planes in which said leading and trailing end portions lie being parallel to the axis of elongation, the projection of the leading end portion in its plane and the projection of the trailing end portion in its plane intersecting at a point removed from the central axis of the strip and being angularly displaced from each other by an angle of 90°, the medial portion of said lure being comprised of a pair of generally planar triangular sections, one of said triangular sections being contiguous with said leading end portion and being bent out of the plane of said leading end portion along a first sharp crease common to said leading end portion and said triangular section, the other of said triangular sections being contiguous with the trailing end portion and bent out of the plane of said trailing end portion along a second sharp crease common to said trailing end portion and said other triangular section, said triangular sections being joined along a third sharp mutual crease, said third crease converging toward opposite sides of said strip of material forming said lure, said first and second creases lying nonparallel to the forward and rear edges of said rectangular strip of material by an amount commensurate with the convergence with said third crease for forming said trapezoidal leading and trailing end portions, the bends occurring at first, second and third creases, when taken with the angular orientation of said creases in said strip being sufficient to establish the aforesaid relationship of said leading and trailing end portions, said leading end portion having means for connecting said lure to a fishing line and said trailing end portion having means for connecting a fish hook to said lure.

2. The fish lure according to claim 1 wherein said leading and trailing end portions present straight forward and rear edges lying normal to the sides of said rectangular strip of metal.

3. The fish lure according to claim 2 wherein said forward edge is sharpened to serve as a weed cutter.

4. The fish lure according to claim 1 wherein the width of said lure exceeds that of the fish hook connected to trailing end.

5. The fish lure according to claim 1 wherein said third sharp mutual crease converges at an angle of 30°–60° with respect to the sides of the strip.

6. The fish lure according to claim 5 wherein said third sharp mutual crease converges at an angle of 45° with respect to the sides of the strip.

* * * * *